US006928455B2

(12) United States Patent
Dougu et al.

(10) Patent No.: US 6,928,455 B2
(45) Date of Patent: Aug. 9, 2005

(54) METHOD OF AND APPARATUS FOR CONTROLLING ACCESS TO THE INTERNET IN A COMPUTER SYSTEM AND COMPUTER READABLE MEDIUM STORING A COMPUTER PROGRAM

(75) Inventors: Toshio Dougu, Ohta-Ku (JP); Noriyuki Takahashi, Ohta-Ku (JP)

(73) Assignee: Digital Arts Inc., Tokyo (JP)

( * ) Notice: Subject to any disclaimer, the term of this patent is extended or adjusted under 35 U.S.C. 154(b) by 462 days.

(21) Appl. No.: 10/255,642

(22) Filed: Sep. 27, 2002

(65) Prior Publication Data

US 2003/0028532 A1 Feb. 6, 2003

Related U.S. Application Data

(63) Continuation of application No. PCT/JP01/02339, filed on Mar. 23, 2001.

(30) Foreign Application Priority Data

Mar. 31, 2000 (JP) ........................................ 2000-096684

(51) Int. Cl.[7] .............................................. G06F 17/30
(52) U.S. Cl. ........................... 707/104.1; 707/3; 707/2; 709/225; 709/246; 713/229; 713/201; 713/200
(58) Field of Search ............................. 707/2, 104.1, 9, 707/3, 203; 709/225, 246; 713/229, 201, 200

(56) References Cited

U.S. PATENT DOCUMENTS

| 5,678,041 | A | 10/1997 | Baker et al. |
| 5,706,507 | A | 1/1998 | Schloss |
| 5,721,897 | A | 2/1998 | Rubinstein |
| 5,835,722 | A | 11/1998 | Bradshaw et al. |
| 5,884,033 | A | 3/1999 | Duvall et al. |
| 5,987,606 | A | 11/1999 | Cirasole et al. |
| 5,996,011 | A | 11/1999 | Humes |
| 6,092,204 | A | 7/2000 | Baker |
| 6,233,618 | B1 | 5/2001 | Shannon |
| 6,317,795 | B1 | 11/2001 | Malkin et al. |
| 2001/0056549 | A1 | 12/2001 | Pinault et al. |

FOREIGN PATENT DOCUMENTS

| JP | 09-026975 A | 1/1997 | ........... G06F/17/30 |
| JP | 10-275157 A | 10/1998 | ........... G06F/17/30 |
| JP | 11-045285 A | 2/1999 | ........... G06F/17/30 |
| JP | 2951307 | 7/1999 | |
| JP | 11-212921 A | 8/1999 | ........... G06F/15/00 |
| JP | 11-242625 A | 9/1999 | ........... G06F/12/00 |
| JP | 11-259389 A | 9/1999 | ........... G06F/13/00 |
| JP | 11-205380 A | 11/1999 | ........... H04L/12/54 |
| JP | 11-306113 A | 11/1999 | ........... G06F/13/00 |
| JP | 20000-76188 A | 3/2000 | ........... G06F/15/00 |
| JP | 2002-22323 A | 8/2000 | ........... G06F/13/00 |
| JP | 2000-235540 A | 8/2000 | ........... G06F/13/00 |
| JP | 2001-028006 A | 1/2001 | ........... G06F/17/30 |
| JP | 2002-014991 A | 1/2002 | ........... G06F/17/30 |
| KR | 1999-0084858 | 6/1999 | ........... G06F/17/25 |
| KR | 100 287 625 B1 | 1/2001 | ........... G06F/17/25 |
| WO | WO 01/75671 A | 10/2000 | ........... G06F/17/30 |

OTHER PUBLICATIONS

*Guide to Parental Controls/Internet Safety Products*, PEP: Resources for Parents, Educators and Publishers, May 3, 2000; pp. 1–10.

*GuardOne.com™ Announces Release of Its Newest Version of Internet Filtering Software*, Feb. 29, 2000, pp. 1–2.

(Continued)

Primary Examiner—Charles Rones
Assistant Examiner—Belix M. Ortiz
(74) Attorney, Agent, or Firm—Jacobson Holman PLLC

(57) ABSTRACT

The present invention provides a method of and apparatus for controlling internet browsing and computer readable medium storing a computer program carrying out the method of the present invention. The present invention provides a database storing worthwhile keywords. When a worthwhile keyword is included in contents or information from the Internet, a user is allowed to browse such contents or information even if a forbidden keyword is included.

14 Claims, 5 Drawing Sheets

OTHER PUBLICATIONS

*Series, Computer & Communication, The Status of Filtering Software*, Inoue et al., Information Processing, KDD Research, vol. 40, No. 10, Oct. 15, 1999, p. 1107–10.

ALSI (Case Study) Kabushikikaisha Kikei System, *Filtering Software For Shutting Out Harmful Information To Use The Internet Effectively*, Nikkei Multimedia, vol. 30, Dec. 15, 1997, p. 133.

Q&A: *How to Prevent Students from Being Exposed to Harmful Information from the Internet When Personal Computers Are Connected to the Internet in Junior High School*, DOS/V Power Report, vol. 8, No. 5, May 1, 1998.

Contents Rating & Filtering in the Internet, Kokubu, S., Information Processing, vol. 40, No. 1, Jan. 15, 1999, pp. 57–61.

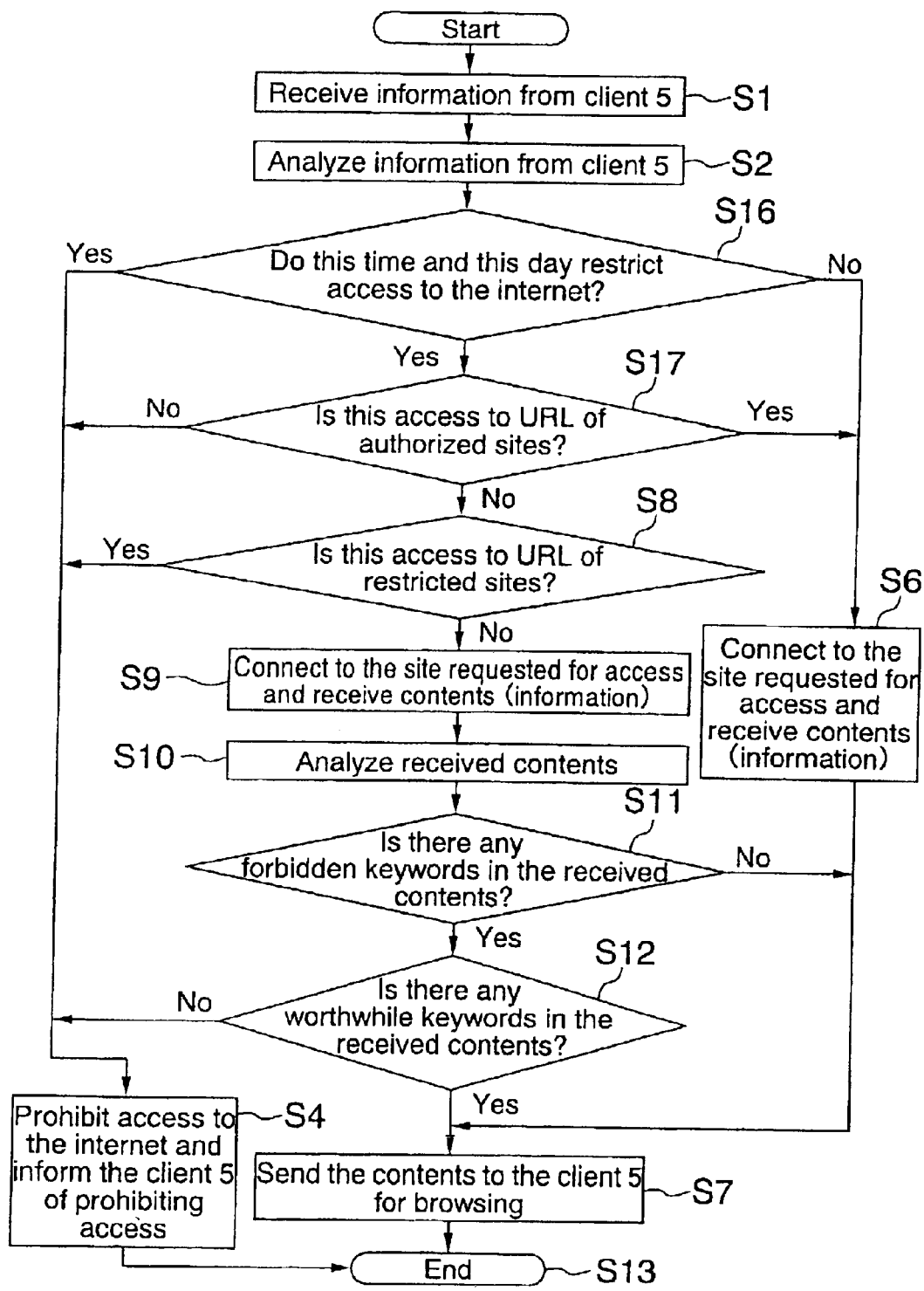

METHOD OF AND APPARATUS FOR CONTROLLING ACCESS TO THE INTERNET IN A COMPUTER SYSTEM AND COMPUTER READABLE MEDIUM STORING A COMPUTER PROGRAM

This is a continuation of PCT/JP01/02339, filed Mar. 23, 2001 and published in Japanese.

TECHNICAL FIELD

This invention relates generally to a method of and apparatus for controlling access to the Internet in a computer system and computer readable medium storing a computer program implementing the method on a computer. More particularly, it relates to an improved method of and apparatus for enabling a network operator to monitor, control, or filter the access of client computers to Internet sites which provide various kinds of information, contents and services through the World Wide Web (WWW).

BACKGROUND ART

The Internet has become a cultural medium to send and receive various kinds of visual, audiovisual or other type of multimedia information. By using a WWW browser software, it is possible to have instantly access to Internet sites around the world through the Internet which provide various kinds of information contents and services to browse such contents and send data to Internet sites. In addition, data, mail or message can be immediately exchanged with many people around the world through the Internet. The Internet has become widely used at office, school and home recently.

Various kinds of information, contents and services, such as shopping, news service, retrieval of information like library, delivery of music, and trading stocks, are provided through the Internet today. Therefore, more and more offices, schools, and homes are being connected to the Internet, which changes business, education, and our daily life significantly.

On the other hand, there is no border control in the Internet. Any one can open his or her own home page in the Internet to provide any kind of information to the public. There are little law and regulations which governs and are well enforced in the cyberspace, the Internet. Therefore, there could be some Internet sites which provide injurious contents, such as contents of pornography, violence or inducing illicit conducts which are harmful or too much sensational to children and juvenile. However, everyone can have access to any Internet sites by using a WWW browser software at school, office or home. On the other hand, there are Internet sites providing contents or services which are not harmful but have nothing to do with work at office. Employees might spend time at office to browse these Internet site just for fun, which could deteriorate work performance and could jam data communication line by unnecessary data traffic on the line at office.

Therefore, as Internet connection to office, school and home has become common, it is necessary to provide a method and apparatus for controlling user's access to the Internet so as to prohibit unsuitable information from entering into office, school or home and ensuring that only appropriate information can be browsed and used by users through the Internet. That is, a method or apparatus for filtering and screening out information or contents from the Internet which is harmful or inappropriate to users is required.

Prior art method and apparatus are disclosed by Japanese published unexamined patent application 10-275157 and "Companies Start Controlling Internet Access, Second Part, Software For Monitoring And Controlling Internet Access", Nikkei Computer, pp.87–91, 1999.5.10. The prior art apparatus or method includes a means or step for checking for predetermined harmful keywords in information or contents from the Internet before the information or contents are displayed on a display screen at a client computer. If the information or contents include the predetermined harmful keywords, the display of the information or contents at a client computer is prohibited and the Uniform Resource Locator (URL) of the Internet site which sent the information or contents to the client computer is recorded for prohibiting client's future access. Japanese Patent No. 2951307 discloses a system which checks for harmful or defamation words in a message to be displayed in a bulletin board in an Internet site or other computer network system and if there is such a word in a message, the display of the message on a bulletin board is rejected by the system.

However, there is a problem in prior art, that is, it takes time to look for harmful, injurious, or defamation keywords in information or contents from Internet sites each time before displaying the information or contents on a display screen at a computer. Moreover, there is another problem in prior art, that is, once such a keyword is found, the display of the information or contents including such a keyword is prohibited. However, it does not necessarily mean that information or contents including harmful, injurious, or defamation keywords are always harmful, injurious, or defamation by themselves. For example, news articles from Internet sites operated by news agency which report crime sometimes include harmful keywords, such as "murder" etc. But, news article reporting such a crime is not harmful per se and it may not need to prohibit news article reporting crime from Internet sites operated by news agencies from being displayed on a display screen on a client computer. Prior art apparatus or software sometimes prohibit even useful information or contents from Internet sites from being displayed on a display screen just because of the existence of forbidden keywords.

DISCLOSURE OF INVENTION

Therefore, it is an object of the invention to minimize the time taken to examine information or contents from Internet sites before displaying on a display screen.

It is another object of the invention not to prohibit information or contents which are not harmful per se from being displayed just because of the existence of forbidden keywords.

It is another object of the invention to control access of users to the Internet based on the type of access.

These and other objects are accomplished by providing a method for controlling access to outside information through the Internet, comprising the steps of: providing a first database including a list of accessible Internet sites, providing a second database including a list of prohibited Internet sites, providing a third database including forbidden keywords, providing a forth database including worthwhile keywords, when a user tries to have access to Internet sites in either the first or second database, allowing access to Internet sites included in the first database and prohibiting access to Internet sites included in the second database, when a user tries to have access to an Internet site included in neither the first database nor the second database, examining information or contents sent from the Internet site in neither the first nor second database so as to see if there is a keyword included in the third database in the information or contents, if there is no keyword in the third database is included, then allowing displaying the information or contents from the Internet site in neither the first nor second database to the user, if there is a keyword in the third database in the information or contents, then examining the information or contents to see if there is a keyword included in the forth database, and allowing displaying the information or contents from the Internet site in neither the first nor second database to the user only if there is a keyword included in the forth database in the information or contents.

Accordingly, it is advantage of the invention to provide a user with fast access to Internet sites included in the first database in order to display information or contents from the sites on a display screen. In case of Internet sites included in the second database, it is advantage of the invention to provide a user with a notice telling that the user is not authorized to have access to the particular Internet sites on a display screen as soon as possible when the user tries to have access to the sites. In case of Internet sites included in neither first nor second database. The method according to the invention retrieves information or contents from the sites when a user requests and examines the information or contents from the sites as to if there is any keyword included in the third database before displaying the information or contents on a display screen If there is no keyword included in the third database in the information or contents from the sites, the information or contents from the sites are displayed on a display screen so that the user can browse them. But, if there is any keyword included in the third database, the method according to the invention further examines the information and contents from the sites as to if there is additionally any keyword included in the forth database. If there is any keyword included in the forth database, the information or contents from the sites are displayed on a display screen so that the user can browse them. Therefore, it is another advantage of the invention to provide a user with information or contents worthwhile access, such as news and academic information, even though they are including a forbidden word in them. In prior art, any information or contents including a harmful keyword, such as a forbidden keyword in the third database, are prohibited from being displayed on a display screen even though the information or contents per se are not injurious but worthwhile.

According to another aspect of the invention, the method further comprises the step of, according to clock and/or calendar, allocating days in a week and/or hours in a day into restricted day(s) and/or hour(s) in which any Internet access is prohibited, non-restricted day(s) and/or hour(s) in which Internet access is free from any restriction, selected access day(s) and/or hour(s) in which Internet access to only Internet sites included in the first database is allowed, and regulated day(s) and/or hour(s) in which Internet access is regulated by the above method. It is another advantage of the invention to be able to control Internet access more flexible depending on days and hours, for example, during some hours such as midnight when children are not supposed to use the Internet, users can freely have access to the Internet, from 9AM to 5PM in weekday, all Internet access are prohibited or only Internet sites included in the first database are allowed to have access to, and during in weekend and other hours in weekday, Internet access is regulated by the above method.

According to another aspect of the invention, the method further comprises the steps of providing a plurality of client computers, dividing a plurality of the client computers into four groups, allowing the firs group of the client computers to free access to the Internet, allowing the second group of the client computers to have access to only Internet sites included in the first database, prohibiting the third group of the client computers from having access to the Internet, and allowing the fourth group of the client computers to the Internet in accordance with the above method. It is another advantage of the invention to be able to control Internet access depending upon the groups of client computers. For example, in school or office, no restriction for access to the Internet is provided for managers, some degree of restrictions for access the Internet is provided for pupils and employees.

According to another aspect of the invention, the method further comprises the steps of dividing the accessible Internet sites in the first database, the prohibited Internet sites in the second database, the forbidden keywords in the third database, and the worthwhile keywords in the fourth database into several groups having the same or similar attributes respectively, and activating or deactivating each of the groups in the first through fourth database to select groups of Internet sites or keywords. It is another advantage of the invention to be able to activate or deactivate each of groups in the first to fourth database to select groups of sites or keywords having the same or similar attributes.

According to another aspect of the invention, the method further comprises the steps of connecting the first and through fourth database with the Internet, and updating the first through fourth database by way of the Internet. It is another advantage of the invention to be able to update the first through fourth database through the Internet so as to keep up with the recent development of the Internet and help an operator with the update of the database.

According to another aspect of the invention, the method further comprises the step of reading out the contents of the first through fourth database through the Internet from outside. It is another advantage of the invention to be able to exchange the contents of the first through fourth database through the Internet in two way.

According to another aspect of the invention, the method further comprises the steps of detecting keywords included in information or contents browsed or retrieved through the Internet, and storing the number of times that a particular keyword included in information or contents browsed or retrieved is detected. It is another advantage of the invention to be able to monitor and control access to the Internet.

According to another aspect of the invention, the method further comprises the steps of counting the appearances of keywords included in information or contents browsed or retrieved by a client computer through the Internet, and storing the number of times that a particular keyword included in information or contents browsed or retrieved by a client computer appears. It is another advantage of the invention to be able to monitor and control access to the Internet client computer by client computer.

According to another aspect of the invention, the method further comprises the steps of determining the type of access to the Internet requested by a user, and allowing or prohibiting access to the Internet depending on the type of access requested by the user. It is another advantage of the invention to be able to control access to the Internet depending on the type of access, for example, just browsing an Internet site is allowed but writing information into an Internet site is prohibited in order to prevent form sending any information outside.

BRIEF DESCRIPTION OF DRAWINGS

These and other objects, features and advantages of the present invention will be more readily understood through the following description with reference to the accompanying drawings, in which:

FIG. 5 is a flowchart showing the steps of a method according to other embodiment of the present invention.

BEST MODE FOR CARRYING OUT THE INVENTION

Figure 1:
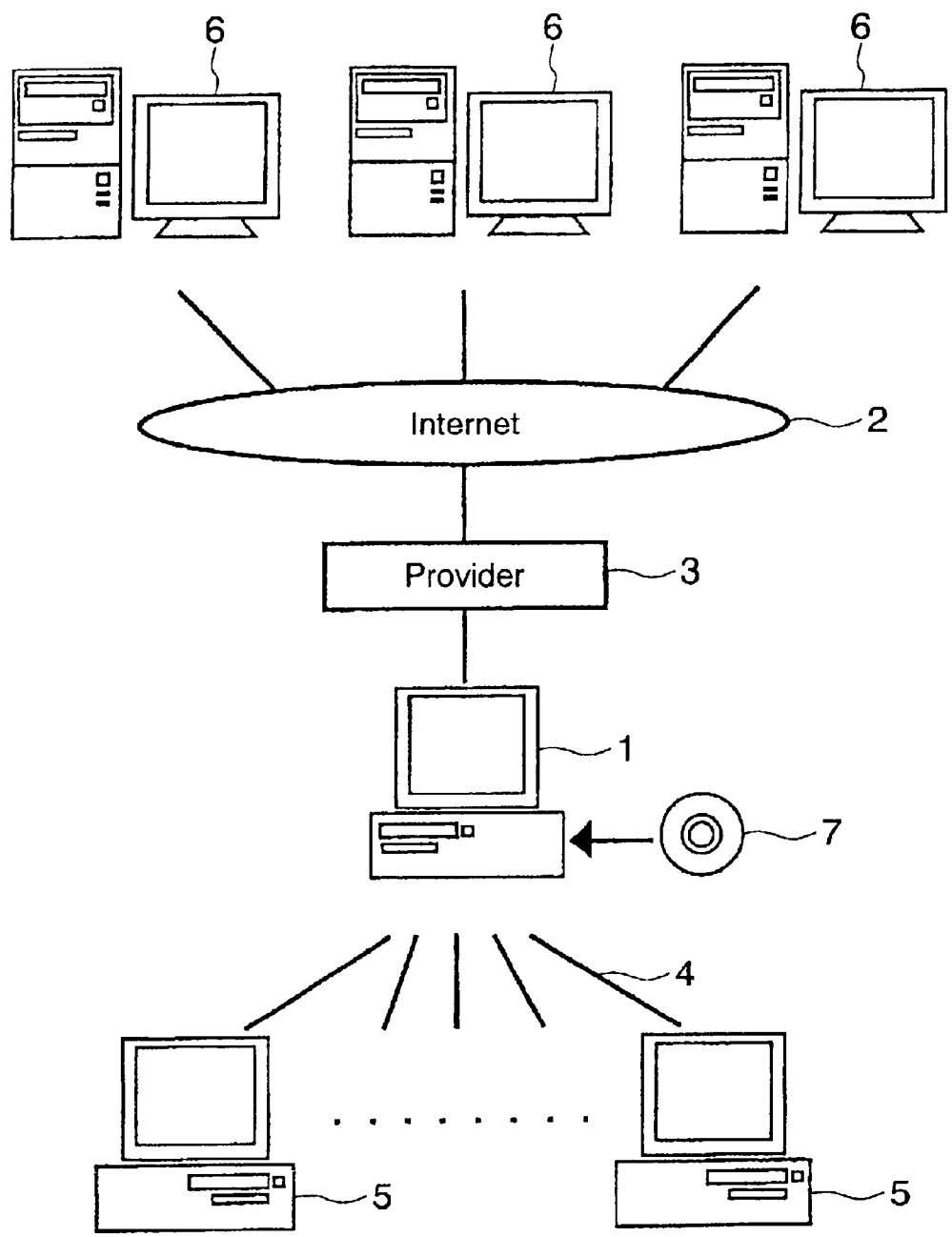
FIG. 1 is a schematic diagram of a computer network including a sever computer and client computers connected to the Internet through the server computer in which a method according to an embodiment of the present invention is used.

In FIG. 1, a schematic diagram of a computer network including a server computer and a plurality of client computers connected to the Internet through the server computer in which a method according to a preferred embodiment of the present invention is implemented. A computer 1 is typically connected to the Internet 2 through a provider 3 which provides the computer 1 with Internet connection. The computer 1 may be a personal computer connected to the provider 3 through dial up. In FIG. 1, the computer 1 is a server computer connected to a plurality of client computers 5 through a local area network 4 and may be implemented as a proxy server. This local area-network 4 may be a local area network in school or office. Various kinds of WWW servers 6 around the world are connected to the Internet 2. Each of WWW servers 6 provides an Internet site which is identified and accessible through URL Internet sites provide various kinds of information or contents which are accessible through a browser software. Home page is typically the entrance of an Internet site through which various information or contents are accessible.

Information or contents in WWW servers 6 are hypertext written in the Hypertext Markup Language (HTML) which can include text, graphics, images, sound, video, and etc. An example of contents written in HTML is shown in pages 21 through 23, "Encyclopedia of Information Processing '98/'99", the Society of Information Processing, 1997. The retrieval of information or contents in a WWW server 6 is generally achieved through a WWW browser software (not shown) installed at a client computer 5. The WWW browser software can not only browse information or contents in a WWW server 6 by retrieving the information or contents from a WWW server 6 and then displaying the information or contents on a display screen of a client computer 5 but also send information to a WWW server 6 from a client computer 5, for example, writing text into a bulletin board of a WWW server 6. In addition, the WWW browser software can provide client computers 5 with chatting function, that is, message exchange function among client computers 5.

Figure 2:
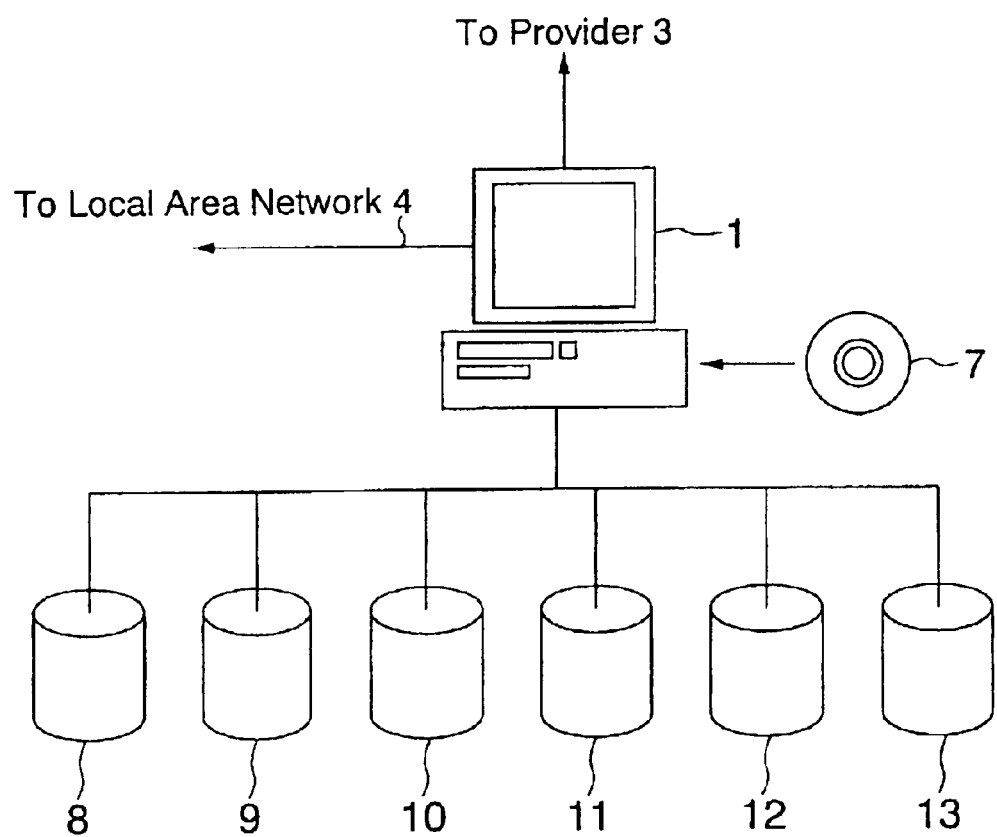
FIG. 2 is a schematic diagram of a server computer in a computer network shown in FIG. 1.

The method of the present invention is implemented in the proxy server computer 1 in FIG. 1. Computer program for implementing the method of the present invention is stored in a computer readable media, such as CD-ROM 7. As shown in FIG. 2, when the computer program is installed into the server computer 1, the computer program builds a first databases 8 and a second database 9 in the server computer 1. The first database 8 includes a list of URLs of Internet sites to which an operator of this local area network 4 allows users to have access. This list, that is, so-called a white list, includes URLs of accessible Internet sites which an operator of the local area network 4 considers suitable for the use in the network 4, such as, Internet sites of schools, academic organizations, governmental organizations, and other public institutions. The second database 9 includes a list of URLs of Internet sites to which an operator of the local area network 4 prohibits users from having access. This list, that is, so-called black list, includes URLs of prohibited Internet sites which an operator of the local area network 4 considers harmful to the objective of the local area network 4, such as Internet sites of pornography and gambling.

CD-ROM 7 may include a white list for the first database 8 and a black list for the second data base beforehand. The both white and black lists in CD-ROM 7 are divided into several groups based of attributes of Internet sites therein, for example, a group of school sites, a group of governmental institution sites, a group of pornography sites, and a group of gambling sites. An operator of the local area network 4 may select those groups in white and black lists in the first and second databases 8 and 9 by activating or deactivating each of the groups to meet the objective of the local area network 4. In addition, an operator of the local area network 4 may add or delete any Internet site to or from each of activated groups of white and black lists in the first and the second databases 8 and 9 at any time. The activated groups in the white and black lists in the first and the second databases 8 and 9 are used in the flowchart in FIG. 3 which is hereinafter explained. The deactivated groups in the white and black lists in the first and the second databases 8 and 9 are not used in the flowchart in FIG. 3.

Referring to FIG. 2 again, the computer program in CD-ROM 7 further builds a third database 10 and a fourth database 11 in the server computer 1 when the program is installed into the server computer 1. The third database 10 includes a list of forbidden keywords in information or contents from Internet sites which an operator of the local area network considers harmful to the objectives of the local area network 4. The list of forbidden keywords includes, for example, defamation words, words inducing criminal activities, and discriminative words in English and other languages. The fourth database 11 includes a list of worthwhile keywords in information or contents from Internet sites which tell that the information or contents is worthwhile browsing or displaying even though a forbidden word is included in them. The list of worthwhile keywords includes, for example, words used in journalism, medical words, and legal words in both English and other language. CD-ROM 7 may include a list of forbidden words and a list of worthwhile words beforehand. Forbidden words and worthwhile words in the lists in CD-ROM 7 are divided into several groups based upon its attribute, such as a group of legal words, a group of journalism words, a group of defamation words, and a group of discriminative words.

An operator of the local area network 4 may select the groups of the list of forbidden keywords in the third databases 10 by activating or deactivating each of the groups which the operator considers harmful to the objective of the local area network 4. Further, an operator of the local area network 4 may select the groups in the list of worthwhile keywords in the fourth databases 11 by activating or deactivating each of the groups to meet the objective of the local area network 4, which allows contents or information from Internet sites to be displayed or browsed on a client computer 5 even though a forbidden word in the activated groups in the third database 10 is included in the information or contents. In addition, an operator of the local area network 4 may add or delete any keyword to or from each of activated groups of the lists in the third and fourth databases 10 and 11 at any time. The activated groups in the lists in the third and fourth databases 10 and 11 are used in the flowchart in FIG. 3 which is hereinafter explained. The deactivated groups in the lists in the third and fourth databases 10 and 11 are not used in the flowchart in FIG. 3.

Referring to FIG. 2 again, the computer program in CD-ROM 7 further builds a fifth database 12 in the server computer 1 when the program is installed into the server computer 1. The fifth database 12 stores the history of the use of the Internet by each of the client computers 5 of the local area network 4. The fifth database 12 stores URLs of Internet sites accessed by each client computer 5, and the number of times that representative keywords are detected in information or contents sent from Internet sites and displayed on a display screen of each of the client computers 5. Representative keywords mean words representing the feature of the information or contents and may be forbidden keywords in the third database 10 and worthwhile keywords in the fourth database 11. Alternatively, representative keywords may be chosen independently from forbidden and worthwhile keywords in the databases 10 and 11. Representative keywords may be in English or other language.

The computer program in CD-ROM 7 further builds a sixth database 13 in the server computer 1 when the program is installed into the server computer 1. The sixth database 13 stores identification data, such as IP address of the client computers 5, to identify each of the client computers 5 connected to the local area network 4. The method of the present invention uses this identification data to control access of the client computers 5 to the Internet.

Figure 3:
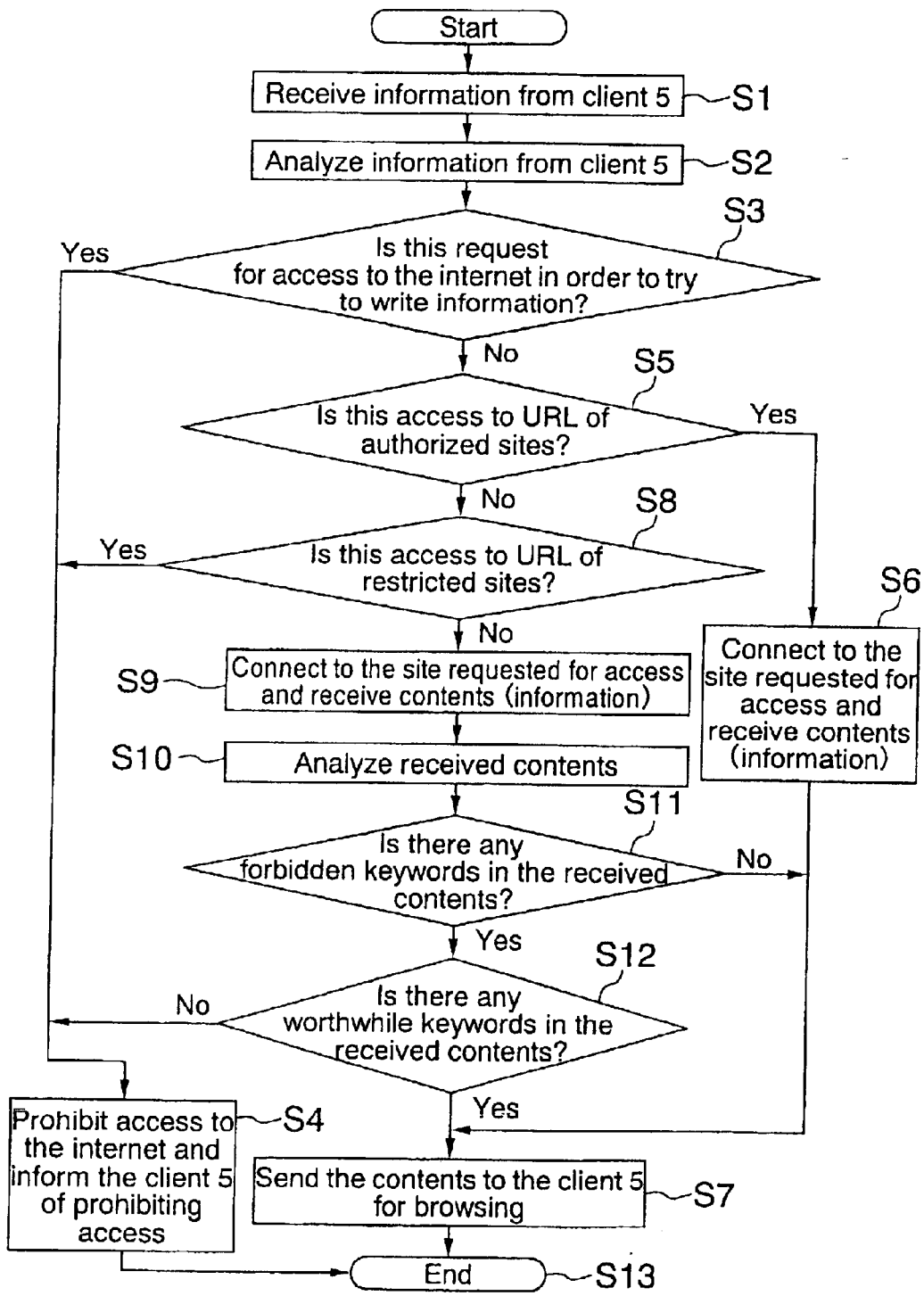
FIG. 3 is a flowchart showing the steps of a method according to an embodiment of the present invention.

In FIG. 3, a flowchart for implementing Internet browsing control method according to a first embodiment of the present inventions is shown. The method is implemented by the computer program installed in the server computer 1 from CD-ROM 7. After the Internet browsing control method starts, the server computer 1 receives an access request to the Internet 2 from a client computer 5 at step S1. The server computer 1 analyzes the access request to the Internet 2 from a client computer 5 at step S2 with respect to IP address of a client computer 5 stored in the database 13. At the step S2, the server computer 1 also determines if an operator of the local area network 4 allows client computers 5 only to browse Internet sites and prohibits client computers 5 from writing information into WWW servers 6 in the Internet. In this embodiment, let's assume that an operator of the local area network 4 prohibits all client computers 5 from writing information into WWW servers 5 through the Internet 2. Alternatively, the operator may allow some of or all of client computers 5 to write information into WWW servers 6. At step S3, if the access request from client computers 5 is to write information into WWW servers 6, then the server computer 1 goes to step S4 to prohibit the access request from the client computers 5 from writing information into WWW servers 6 and informs the requested client computer 5 with the rejection of the access request to the Internet. If the access request from client computers 5 is to just retrieve information or contents from a WWW server 6, then the server computer 1 goes to step S5.

At the step S5, the server computer 1 examines URL of a WWW server 6 from which the client computer 5 requests to retrieve information or contents as to if the URL of a WWW server 6 are included in the first database 8. If the URL of WWW servers 6 form which the client computer 5 requests to retrieve information or contents is included in the first database 8, then the server computer 1 goes to step S6. At the step S6, the sever computer 1 connects to a WWW server 6 through the Internet 2 by using Hypertext Transfer Protocol (HTTP) and retrieves information or contents from the WWW server 6. The server computer 1 goes to step 7 and sends the information or contents retrieved from the WWW server 6 to the requested client computer 5 through the local area network 4. Then, the information or contents from the WWW server 6 is displayed on a display screen of a client computer 5.

At the step 5, if the URL of WWW servers 6 from which the client computer 6 requests to retrieve information or contents is not in the first database 8, then the server computer 1 goes to step 8. At the step 8, the server computer 1 examines the URL of a WWW server 6 from which the client computer 5 requests to retrieve information or contents as to if the URL of a WWW server 6 are included in the second database 9. If the URL is included in the second database 9, then the server computer 1 goes to the step 4 in order to prohibit the Internet access of the client computer 5. If the URL is not included in the second database 9, then the server computer 1 goes to step 9. At the step 9, the server computer 1 connects to the WWW server 6 through the Internet 2 by using the HTTP and retrieves information or contents from the WWW server 6. The retrieved information or contents from the WWW server 6 is examined at step 11.

At the step 11, if there is no forbidden keyword stored in the third database 10 in the retrieved information or contents from the WWW server 6, then the server computer 1 goes to the step S7 to send the retrieved information or contents to the requested client 5 computer in order to display the information or contents on a display screen of the client computer 5. If the information or contents retrieved from the WWW server 6 includes a forbidden keyword in the third database 10, then the server computer 1 goes to step S12 in order to examine the information or contents as to if there is a worthwhile keyword is included in the information or contents at the same time. At the step 11, the server computer 1 may count the number of the appearances of forbidden keywords in the information or contents from the WWW server 6. If the number of the appearances of forbidden keywords is very small in the information or contents, such as one or two, the server computer 1 may go to the step S7 instead of the step S12. Alternatively, an operator of the local area network 4 may choose that, if at lease one forbidden keyword is found at the step S11, the sever computer 1 always goes to the step S12.

At the step S12, if the server computer 1 finds a worthwhile keyword stored in the fourth database in the information or contents retrieved from the WWW server 6 with a forbidden keyword stored in the third database 10, then the server computer 1 goes to the step 7 to send the information and contents to the requested client computer 5 in order to display the information or contents on a display screen of the requested client computer 5. The existence of a worthwhile keyword makes the information or contents including a forbidden keyword worthwhile displaying. For example, if a forbidden keyword stored in the third database 10, such as, "cocaine", "amphetamine", is found in the information or contents from a WVVW server 6 at the step S11, the information or contents might be offering or selling such a drug and come from an illegal Internet site. However, if a worthwhile keyword, such as "news" which is in a group of journalism words selected and activated by an operator of the local area network 4 and stored in the fourth database 11, is found in the same information or contents as the forbidden keyword "cocaine" at the step S12, the information or contents are thought to come from an Internet site providing news articles. Then, since the operator allows the client computers 5 to browse news articles through the Internet by selecting and activating the group of journalism words in the fourth database 11, the information or contents are sent to the requested client computer 5 in order to be displayed at the step 7. If another worthwhile keyword, such as, "imprisonment" from a group of legal words, is found in the same information or contents as the forbidden keyword "cocaine", the information or contents are thought to come from a legitimate Internet site explaining the punishment or criminal law against the misuse of drug. Therefore, if an operator of the local area network 4 allows client computers 5 to have access to Internet sites about laws, the operator should select and activate the group of legal words stored in the fourth database 11 beforehand. If another worthwhile keyword, such as, "pharmacological effect" from a group of medical words, is found in the same information or contents as the forbidden keyword "cocaine", the information or contents are thought to come from a legitimate Internet site of medical matters. Therefore, if an operator of the local area network 4 want to allow client computers 5 to have access to Internet sites about medical matters, the operator should select and activate the group of medical words stored in the fourth database 11 beforehand.

However, at the step S12, if there is no worthwhile keyword in the forth database 11 is found in the same information or contents as the forbidden keyword "cocaine", it is very likely that the information or contents come from an illegal Internet site offering or selling drug. Therefore, the server computer 1 goes to the step S4 to prohibit the information or contents from being displayed on the requested client computer 5.

Some examples of forbidden keywords stored in the third database 10 and worthwhile keywords stored in the fourth database 11 are explained in the above. Those who are skilled in the art easily choose various kinds of forbidden keywords and worthwhile keywords for the third and fourth databases 10 and 11.

At step S13, an end process of the method according to the first embodiment is done by storing URLs of Internet sites accessed by client computers 5, forbidden keywords, worthwhile keywords, and representative keywords found in the information or contents accessed by client computers 5 and their counts of appearance for each of client computers 5 in the fifth database 12.

Figure 4:
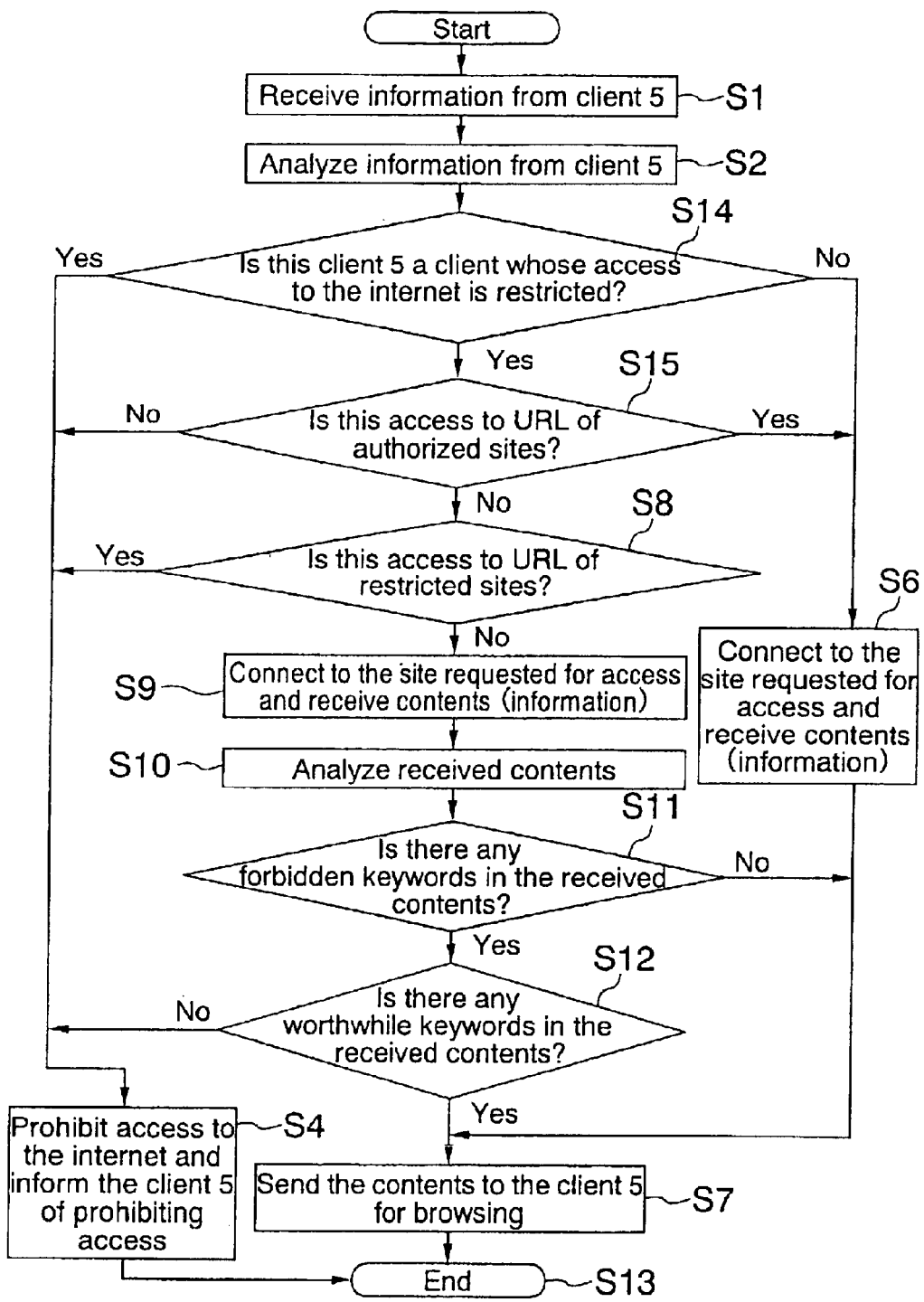
FIG. 4 is a flowchart showing the steps of a method according to another embodiment of the present invention.

FIG. 4 shows a flowchart of Internet browsing control method according to a second embodiment of the present invention. In FIG. 4, the explanation about the same steps in the flowchart as those of FIG. 3 is omitted and given the same reference numbers as FIG. 3. The Internet browsing control method according to the second embodiment of the present invention controls Internet access client computer by client computer. In the method, there are four groups of client computers 5 about the control of Internet access, that is, a first group of client computers 5 to which no Internet access control is applied, a second group of client computers 5 which is prohibited to have access to the Internet, a third group of client computers 5 which can have access to Internet sites included in the list of the first database 8, and a fourth group of client computers 5 which Internet access is controlled by the flowchart explained in FIG. 3. Each of the client computers 5 belongs to one of the four groups. Information about which group a particular client computer 5 belongs to stored in the fifth database 12.

The method in FIG. 4 determines which group a client computer requesting Internet access is included in by comparing IP address of a client computer 5 requesting Internet access with the group information of the client computer 5 stored in the fifth database 12. at step S14. If a client computer 5 requesting Internet access is included in the first group of client computers 5 which an operator of the local area network 4 allows to have access to the Internet without any restriction, then the server computer 1 goes to step S6 to connect to a WWW server 6 in order to retrieve information or contents. If a client computer requesting Internet access is included in the second group of client computers 5 which an operator of the local area network 4 prohibits from having access to any Internet sites, then the server computer 1 goes to step S6 to prohibit and reject the Internet access. If a client computer 5 requesting Internet access is included in the third group of client computers 5 which an operator of the local area network 4 allows to have access to Internet sites only included in the list of the first database 8 or in the fourth group of client computers 5 to which an operator applies the same steps as those of FIG. 3, then the server computer 1 goes to step S15.

At the step S15, if the client computer 5 is included in the third group, then the server computer 1 determines whether or not the URL of the Internet site requested by the client computer 5 is included in the first database 8. If the URL of the Internet site is included in the list of the first database 8, then the server computer 1 goes to the step S6. If the URL of the Internet site is not included in the list of the first database, then the server computer 1 goes to the step S4. If the client computer requesting Internet access is included in the fourth group to which the same steps as those in FIG. 3 is applied, then the server computer 1 determines whether or not the URL of the Internet site requested by the client computer 5 is included in the list of the first database 8. If the URL of the Internet site is included in the list of the first database 8, then the server computer 1 goes to the step S6. If the URL of the Internet site is not included in the list of the first database 8, then the server computer 1 goes to step S8. The same steps as those of FIG. 3 are taken.

FIG. 5 shows a flowchart of Internet browsing control method according to a third embodiment of the present invention. In FIG. 5, the explanation of the same steps in the flowchart as those of FIG. 3 is omitted and given the same reference numbers as FIG. 3. In the method according to the third embodiment of the present invention, Internet access is controlled by clock and/or calendar. At step S16, the server computer 1 determines if Internet access is allowed without any restriction at present, any Internet access is prohibited at present, Internet access only to Internet sites included in the first database 8 is allowed at present, or Internet access is being controlled at present, according to clock means and calendar means provided in the server computer 1 depending on what day and what hour it is. For example, at midnight, Internet access can be free without any restriction since children are not supposed to have access to the Internet then. From 9AM to 5PM in weekday, Internet access is prohibited or alternatively Internet access only to Internet sites included in the first database 8 is allowed since this time zone is working hours at office. During other time zones including weekend, Internet access is controlled by the method shown in FIG. 3 since Internet access still needs some control.

If it is midnight, then the server computer 1 goes to step S6 to connect to a WWW server 6 through the Internet. If it is working time in weekday, then the server computer 1 goes to step S4 to prohibit Internet access or alternatively goes to step S17 to determine if the URL of Internet site requested by a client computer 5 is included in the list in the first database 8. If it is after 5PM in weekday or in weekend, the server computer 1 goes to step S17 to determine if the URL of Internet site requested by a client computer 5 is included in the list in the first database 8.

At the step S17, the same process as the step S15 in FIG. 4 will be done. When only access to Internet sites included in the first database 8 is allowed, the server computer 1 goes to the step S6 if the URL of the Internet site requested by a client computer 5 is included in the first database 8 and the server computer 1 goes to the step S4 if the URL of the Internet site requested by a client computer 5 is not included in the list in the first data base 8. When access to Internet sites which are not included in the lists in the first and second databases 8 and 9 is controlled depending on the existence of a forbidden keyword and a worthwhile keyword in the third and fourth databases 10 and 11, respectively, the server computer 1 goes to the step S6 if the URL of the Internet site requested by a client computer 5 is included in the first database 8 and the server computer 1 goes to the step S8 if the URL of the Internet site requested by a client computer 5 is not included in the list in the first data base 8.

The proxy server computer 1 shown in FIG. 1 and FIG. 2 may be without a monitor display and controlled through one of client computers 5 so that an operator of the local area network 4 sets, controls, monitors, and updates the first through sixth databases 8, 9, 10, 11, 12, and 13 from one of client computers 5. Other client computers 5 can not have access to these databases 8 through 13. An operator of the local area network 4 may control access to the Internet through the local area network 4 client computer by client computer by using the fifth database 12 which stores control information of each of client computers 5 and the sixth database 13 which stores the history of Internet access by each of the client computers 5.

An operator of the local area network 4 may update the first through fourth databases 8 to 11 in the server computer 1 through the Internet by connecting to a WWW server 6, and downloading updated URLs of accessible Internet sites into the first database 8, updated URLs of prohibited Internet sites into the second database 9, updated forbidden keywords into the third database 10, and updated worthwhile keywords into the fourth database 11. An operator of the local area network 4 may send the contents of the first through the fourth databases 8 to 11 to a WWW server 6 through the Internet. The first through fourth databases can be updated or shared through the Internet so that Internet browsing control method is optimized with the fast developing Internet.

Although several embodiments of the present invention and its advantages have been described in detail, it should be understood that changes, substations, modifications, variations, and alterations can be made therein without departing from the sprit and scope of the invention being set forth by the appended claims.

INDUSTRIAL APPLICABILITY

The present invention is able to be used in a computer connected to the Internet for browsing Internet sites. The present invention is particularly useful for controlling Internet access at home, office and school.

What is claimed is:

1. A method for controlling access to outside sites through the Internet by using a computer system, including a first database storing a list of Uniform Resource Locators (URLs) of accessible Internet sites, a second database storing a list of URLs of prohibited Internet sites, a third database storing forbidden keywords and a fourth database storing worthwhile keywords, comprising the steps of:

when a user tries to have access to Internet sites of which URLs are stored in either the first or second database, allowing access to Internet sites of which URLs are stored in the first database and prohibiting access to Internet sites of which URLs are stored in the second database, when a user tries to have access to an Internet site of which a URL is stored in neither the first database nor the second database, examining information or contents retrieved from the Internet site of which the URL is neither stored in the first nor second database so as to examine if there is a forbidden keyword stored in the third database in the retrieved information or contents, if there is no forbidden keyword stored in the third database in the retrieved information or contents, then allowing displaying of the information or contents retrieved from the Internet site of which the URL is neither stored in the first nor second database to the user, if there is a forbidden keyword stored in the third database in the retrieved information or contents, then examining the retrieved information or contents if there is a worthwhile keyword stored in the fourth database, and allowing displaying of the information or contents retrieved from the Internet site of which the URL is neither stored in the first nor second database to the user only if there is a worthwhile keyword stored in the fourth database in the information or contents with the forbidden keyword stored in the third database.

2. The method as recited in claim 1 further comprising the step of:

according to a clock and/or a calendar, allocating days and/or hours into four time zones, wherein the first time zone is restricted day(s) and/or hour(s) when any Internet access is prohibited, the second time zone is non-restricted day(s) and/or hour(s) when Internet access is free without any restriction, the third time zone is selected access day(s) and/or hour(s) when Internet access to only Internet sites of which URLs are stored in the first database is allowed, and the fourth time zone is regulated day(s) and/or hour(s) when Internet access is controlled in accordance with the method steps set forth in claim 1.

3. The method as recited in claim 1 wherein the computer system is connected to a plurality of client computers through a local area network, further comprising the steps of:

dividing a plurality of the client computers into four groups, allowing the first group of the client computers to freely have access to the Internet, allowing the second group of the client computers to have access to only Internet sites of which URLs are stored in the first database, prohibiting the third group of the client computers from having access to the Internet, and allowing the fourth group of the client computers to have access to the Internet sites in accordance with the steps set forth in claim 1.

4. The method as recited in claim 1 further comprising the steps of:
  categorizing each of the accessible Internet sites of which URLs are stored in the first database, the prohibited Internet sites of which URLs are stored in the second database, the forbidden keywords stored in the third database, and the worthwhile keywords stored in the fourth database into several groups according to their attributes respectively, so that the members included in each of the groups have the same or similar attributes, and
  activating or deactivating each of the groups so that the members included in each of the groups are selected to be as active members or non-active members in the first through fourth databases to perform the steps set forth in claim 1.

5. The method as recited in claim 1 further comprising the steps of:
  connecting any one of the first and through fourth databases to the Internet or loading a computer readable medium storing updated URLs of accessible Internet sites, updated URLs of prohibited Internet sites, updated forbidden keywords, or updated worthwhile keywords, and
  updating any one of the first through fourth databases through the Internet or by the computer readable medium.

6. The method as recited in claim 1 further comprising the steps of:
  connecting any one of the first and through fourth databases to the Internet or loading a computer recording medium, and
  reading out the contents stored in any one of the first through fourth databases through the Internet or writing the contents stored in any one of the first through fourth databases into the computer readable medium.

7. The method as recited in claim 6 further comprising the steps of:
  choosing keywords representing the information or contents;
  counting how many times the keywords appear in information or contents retrieved through the Internet, and
  storing the number of times that a particular keyword appears in information or contents retrieved through the Internet.

8. The method as recited in claim 7 further comprising the steps of:
  counting how many times a selected keyword appears in information or contents retrieved through the Internet by each of the client computers connected to the computer system, and
  storing the number of times that the selected keyword appears in the information or contents retrieved through the Internet by each of the client computers.

9. The method as recited in claim 1 further comprising the steps of:
  categorizing Internet access, such as browsing, writing into a bulletin board, and sending e-mail, into prohibited type and permitted type,
  identifying the type of Internet access request by a user; and
  prohibiting Internet access request if the type of the Internet access is prohibited.

10. The method as recited in claim 9 wherein the prohibited type of Internet access is writing information into a bulletin board provided in a WWW server through the Internet (S3).

11. A computer readable medium storing a computer program to control access to outside sites through the Internet by a computer system including a first database storing a list of Uniform Resource Locators (URLs) of accessible Internet sites, a second database storing a list of URLs prohibited Internet sites, a third database storing forbidden keywords, and a fourth database storing worthwhile keywords, comprising:
  computer program means for, when a user tries to have access to Internet sites of which URLs are stored in either the first or second database, allowing access to Internet sites of which URLs are stored in the first database and for prohibiting access to Internet sites of which URLs are stored in the second database,
  computer program means for, when a user tries to have access to an Internet site of which a URL is neither stored in the first database nor the second database, examining information or contents retrieved from the Internet site of which the URL is neither stored in the first nor second database so as to examine if there is a forbidden keyword stored in the third database in the retrieved information or contents,
  computer program means for, if there is no forbidden keyword stored in the third database in the retrieved information or contents, allowing displaying of the information or contents retrieved from the Internet site of which the URL is neither stored in the first nor second database to the user,
  computer program means for, if there is a forbidden keyword stored in the third database in the retrieved information or contents, examining the retrieved information or contents if there is a worthwhile keyword stored in the fourth database, and computer program means for allowing displaying of the information or contents retrieved from the Internet site of which the URL is neither stored in the first nor second database to the user only if there is a worthwhile keyword stored in the fourth database in the information or contents with the forbidden keyword stored in the third database.

12. The computer readable medium as recited in claim 11 further comprising:
  computer program means for categorizing each of the accessible Internet sites of which URLs are stored in the first database, the prohibited Internet sites of which URLs are stored in the second database, the forbidden keywords stored in the third database, and the worthwhile keywords stored in the fourth database into several groups according to their attributes respectively, so that the members included in each of the groups have the same or similar attributes, and
  computer program means for activating or deactivating each of the groups so that the members included in each of the groups are selected to be as active members or non-active members in the first through fourth databases.

13. An apparatus for controlling access to outside sites (6) through the Internet by a computer system including a first database storing a list of Uniform Resource Locators (URLs) of accessible Internet sites, a second database storing a list of URLs prohibited Internet sites, a third database storing forbidden keywords, and a fourth database storing worthwhile keywords, comprising:
  means for, when a user tries to have access to Internet sites of which URLs are stored in either the first or second database, allowing access to Internet sites of which URLs are stored in the first database and for prohibiting access to Internet sites of which URLs are stored in the second database, means for, when a user tries to have access to an Internet site of which a URL is neither stored in the first database nor the second database, examining information or contents retrieved from the Internet site of which the URL is neither stored in the first nor second database so as to examine if there is a forbidden keyword stored in the third database in the retrieved information or contents, means for, if there is no forbidden keyword in the third database, in the retrieved information or contents, allowing displaying of the information or contents retrieved from the Internet site of which the URL is neither stored in the first nor second database to the user, means for, if there is a forbidden keyword stored in the third database in the retrieved information or contents, examining the retrieved information or contents if there is a worthwhile keyword stored in the fourth database, and means for allowing displaying of the information or contents retrieved from the Internet site of which the URL is neither stored in the first nor second database to the user only if there is a worthwhile keyword stored in the fourth database in the information or contents with the forbidden keyword stored in the third database.

14. The apparatus as recited in claim 13 further comprising:

means for categorizing each of the accessible Internet sites of which URLs are stored in the first database, the prohibited Internet sites of which URLs are stored in the second database, the forbidden keywords stored in the third database, and the worthwhile keywords stored in the fourth database into several groups according to their attributes, respectively, so that the members included in each of the groups have the same or similar attributes, and means for activating or deactivating each of the groups so that the members included in each of the groups are selected to be as active members or non-active members in the first through fourth databases.

\* \* \* \* \*